(12) United States Patent
Kim et al.

(10) Patent No.: US 7,954,578 B2
(45) Date of Patent: *Jun. 7, 2011

(54) POWER TRANSMISSION DEVICE FOR HYBRID VEHICLE

(75) Inventors: Wan-Soo Kim, Gyeonggi-do (KR);
Kyung-Ha Kim, Gyeonggi-do (KR);
Yeon Ho Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 340 days.

This patent is subject to a terminal disclaimer.

(21) Appl. No.: 11/999,749

(22) Filed: Dec. 7, 2007

(65) Prior Publication Data

US 2009/0054190 A1    Feb. 26, 2009

(30) Foreign Application Priority Data

Aug. 24, 2007   (KR) ........................ 10-2007-0085366

(51) Int. Cl.
*B60K 6/42* (2007.10)
(52) U.S. Cl. .................. 180/65.22; 180/65.21
(58) Field of Classification Search .............. 180/65.21, 180/65.22, 65.26, 65.285, 369, 381, 65.25; 903/906, 951, 952
See application file for complete search history.

(56) References Cited

U.S. PATENT DOCUMENTS

| 4,346,773 | A | * | 8/1982 | Hofbauer et al. | .............. | 180/165 |
| 5,833,022 | A | * | 11/1998 | Welke | ........................ | 180/65.25 |
| 6,253,437 | B1 | | 7/2001 | Levin | | |
| 6,455,968 | B2 | * | 9/2002 | Honorio et al. | ........... | 310/102 R |
| 6,474,428 | B1 | * | 11/2002 | Fujikawa et al. | .......... | 180/65.25 |
| 6,585,066 | B1 | * | 7/2003 | Koneda et al. | ............. | 180/65.25 |
| 6,655,484 | B2 | | 12/2003 | Levin | | |

(Continued)

FOREIGN PATENT DOCUMENTS

EP    1 236 919 A1    12/2001

(Continued)

*Primary Examiner* — J. Allen Shriver, II
*Assistant Examiner* — Brodie Follman
(74) *Attorney, Agent, or Firm* — Edwards Angell Palmer & Dodge LLP; Peter F. Corless

(57) ABSTRACT

The present invention provides a power transmission device for a hybrid vehicle which provides an effect of reducing engine vibration, facilitates engine clutch control, and has a package type layout enabling mass production.

For this, the preset invention provides a power transmission device for a hybrid vehicle, in which an automatic transmission having an input shaft, a motor, a torsion damper, and an engine having an output shaft connected to a crank shaft of the engine are arranged in a row, the power transmission device including: a motor support shaft, the outer end of which is supported by a motor rotor and the inner end of which extends toward the boundary between the output shaft of the engine and the input shaft of the automatic transmission; a motor housing disposed to surround the outer circumference and the left side surface of the motor rotor; an engine clutch, disposed between the left side end of the motor housing and the left side surface of the inner end of the motor support shaft, for power transmission between the output shaft of the engine and the input shaft of the automatic transmission; a motor cover housing arranged to so as cover the right side surface of the motor rotor and the right side surface of the inner end of the motor support shaft and including a concave portion on the right side surface thereof; and a torsion damper positioned in the concave portion of the motor cover housing to be blocked from the motor rotor.

4 Claims, 2 Drawing Sheets

U.S. PATENT DOCUMENTS

| | | | |
|---|---|---|---|
| 6,668,953 B1* | 12/2003 | Reik et al. | 180/53.8 |
| 6,698,562 B2* | 3/2004 | Teraoka et al. | 192/35 |
| 6,863,140 B2* | 3/2005 | Noreikat et al. | 180/65.23 |
| 7,509,802 B2* | 3/2009 | Hammond et al. | 60/330 |
| 7,578,363 B2* | 8/2009 | Kim | 180/65.25 |
| 7,679,238 B2* | 3/2010 | Nomura et al. | 310/78 |
| 2002/0036434 A1* | 3/2002 | Tsuzuki et al. | 310/83 |
| 2002/0134635 A1* | 9/2002 | Teraoka et al. | 192/35 |
| 2003/0106767 A1* | 6/2003 | Beneton et al. | 192/111 A |
| 2004/0045752 A1* | 3/2004 | Omote et al. | 180/65.2 |
| 2004/0055800 A1* | 3/2004 | Katou et al. | 180/65.2 |

FOREIGN PATENT DOCUMENTS

| | | |
|---|---|---|
| EP | 1 541 401 A1 | 6/2005 |

* cited by examiner

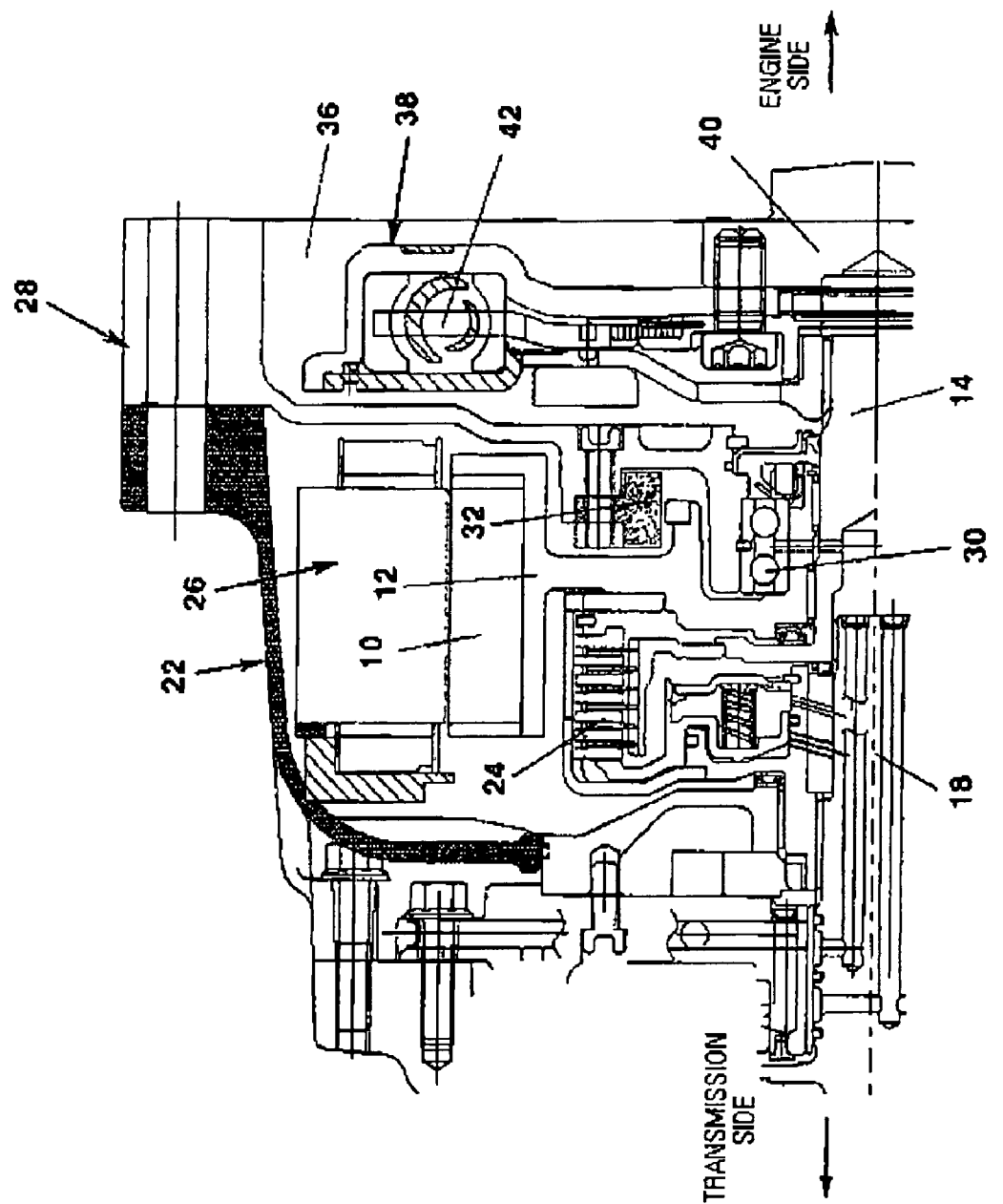

POWER TRANSMISSION DEVICE FOR HYBRID VEHICLE

CROSS-REFERENCE TO RELATED APPLICATION

This application claims the benefit under 35 U.S.C. §119(a) on Korean Patent Application No. 10-2007-0085366 filed on Aug. 24, 2007, the entire contents of which are incorporated herein by reference.

BACKGROUND (a) Technical Field

The present invention relates to a power transmission device for a hybrid vehicle. More particularly, the present invention relates to a power transmission device for a hybrid vehicle capable of reducing engine vibration, facilitating engine clutch control, and providing a package layout suitable for mass production.

(b) Background Art

In general, a power transmission device for a hybrid vehicle has a layout in which an automatic transmission, a motor, an engine and an integrated starter-generator (ISG) are arranged in a row.

In the hybrid vehicle using the engine and the motor in a cooperative manner, the motor having good efficiency at a low RPM is used for initial acceleration. When the vehicle reaches a predetermined speed, the generator, i.e., the ISG starts the engine, and the outputs of the engine and the motor are used simultaneously.

At this time, in order to integrally use the output of the engine and the output of the motor, the vehicle has a structure in which each of the outputs is connected to one unit of a planetary gear of the automatic transmission.

That is, the engine is connected to a carrier of the planetary gear, the ISG is connected to a sun gear of the planetary gear, and the motor is connected to a ring gear.

Accordingly, rotational power of the engine is adjusted to an appropriate speed in the planetary gear of the automatic transmission, then transferred to a drive shaft, and finally transferred to a drive wheel through a propeller shaft.

At the same time, the ISG connected to the sun gear of the planetary gear in the automatic transmission receives the rotational power from the engine and generates electricity during deceleration. The electricity generated by the ISG is charged to a charger through an inverter, not depicted, and then the inverter supplies electricity to the motor for rotating the drive shaft during vehicle startup or acceleration.

Since the power transmission device for a hybrid vehicle has a structure in which the automatic transmission, the motor, the torque converter, the engine and the ISG are arranged in a row, the overall length of the engine room is increased, and thus it is disadvantageous in terms of the layout and mounting of the respective components. Moreover, it is difficult to commonly apply such a power transmission device to a plurality of different platforms. Accordingly, extensive research aimed at developing a power transmission device which is advantageous for mass production and has an optimal layout has continued to progress.

U.S. Pat. No. 6,176,808 discloses a layout for a power transmission for a hybrid vehicle, in which a motor is connected to an input shaft of a transmission through a torsion damper. However, such a layout has a drawback in that the positions of an engine clutch, the torsion damper and the like are complicated.

Moreover, U.S. Pat. No. 6,474,428 discloses a layout for a power transmission for a hybrid vehicle, in which a motor and an engine clutch are not disposed in a space, but partitioned by a cover. Accordingly, it has a drawback in that the motor is not immersed in oil and thus cooling efficiency is reduced.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a power transmission device for a hybrid vehicle, in which an engine clutch is disposed between a motor and an automatic transmission, a portion of the engine clutch is arranged to overlap the inside of the motor, a motor cover housing is mounted between the motor and a torsion damper to prevent transmission oil from flowing to the torsion damper, and a portion of a torsion damper is arranged to overlap a crank shaft. Accordingly, with the optimal layout in which the engine clutch, the motor, the motor housing, and the torsion damper are arranged in a space, it is possible to provide an effect of reducing engine vibration, facilitate engine clutch control, and enable mass production.

In one aspect, the present invention provides a power transmission device for a hybrid vehicle, in which an automatic transmission having an input shaft, a motor, a torsion damper, and an engine having an output shaft connected to a crank shaft of the engine are arranged in a row, the power transmission device comprising: a motor support shaft, the outer end of which is supported by a motor rotor and the inner end of which extends toward the boundary between the output shaft of the engine and the input shaft of the automatic transmission; a motor housing disposed to surround the outer circumference and the left side surface of the motor rotor; an engine clutch, disposed between the left side end of the motor housing and the left side surface of the inner end of the motor support shaft, for power transmission between the output shaft of the engine and the input shaft of the automatic transmission; a motor cover housing arranged so as to cover the right side surface of the motor rotor and the right side surface of the inner end of the motor support shaft and including a concave portion on the right side surface thereof; and a torsion damper positioned in the concave portion of the motor cover housing to be blocked from the motor rotor.

In a preferred embodiment, a support bearing for supporting the rotation of the motor support shaft is mounted between the inner end of the motor support shaft and the inner end of the motor cover housing.

In another preferred embodiment, a motor position sensor is mounted on the left side surface of the inner end of the motor cover housing, while being adjacent to the right side surface of the motor support shaft.

In still another preferred embodiment, the inner end of the motor support shaft is formed integrally at the center position of the outer end of the motor support shaft engaged with the motor rotor.

In a further preferred embodiment, the torsion damper comprises on an outer circumference thereof a torsion spring for attenuating torsional vibration of the engine.

In a yet further preferred embodiment, the torsion damper has a portion arranged to overlap the top of the crank shaft.

It is understood that the term "vehicle", "vehicular" and other similar terms used herein are inclusive of motor vehicles in general, such as passenger automobiles including sports utility vehicles (SUV), buses, trucks, various commercial vehicles, watercraft including a variety of boats and ships, aircraft, and the like. The present devices will be particularly useful with a wide variety of motor vehicles.

BRIEF DESCRIPTION OF THE DRAWINGS

FIG. 2 is a schematic cross-sectional view illustrating the structure of a power transmission device for a hybrid vehicle in accordance with the present invention.

Figure 1:
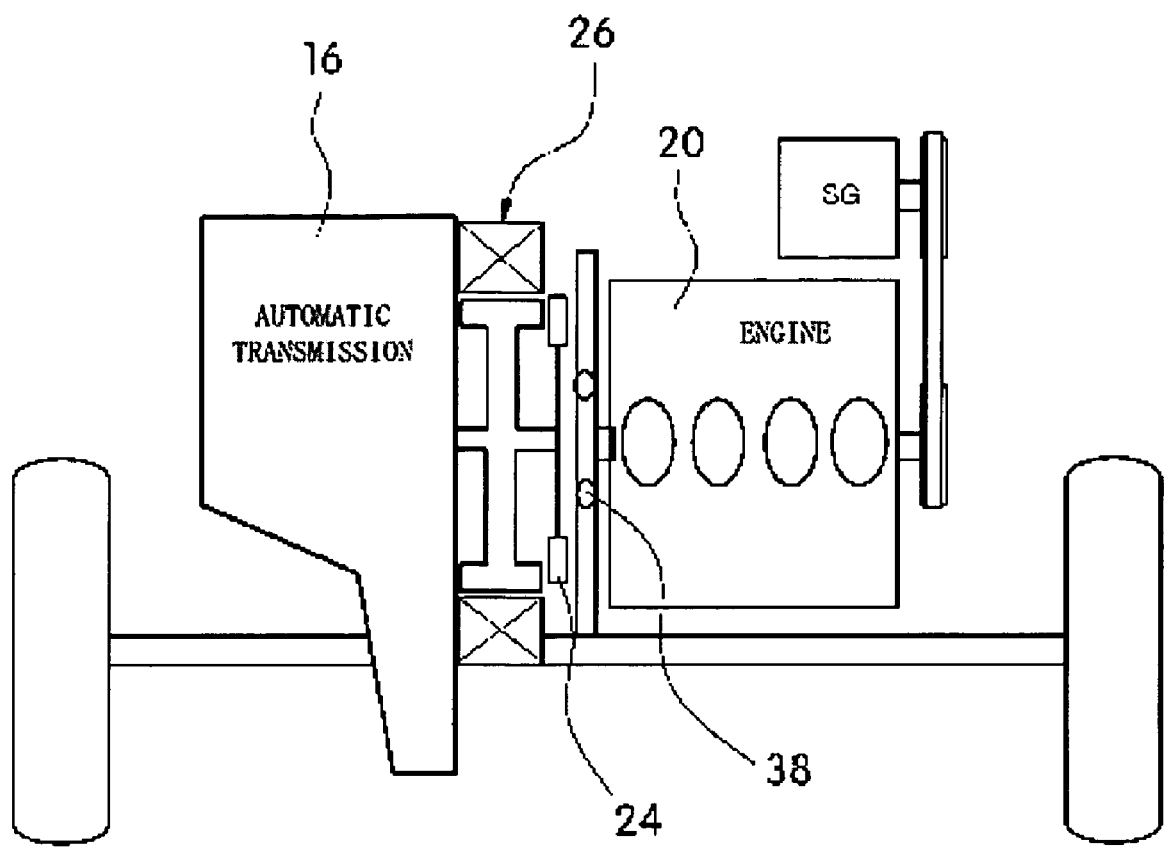
FIG. 1 is a schematic diagram illustrating the power transmission of a power transmission device for a hybrid vehicle in accordance with the present invention.

Reference numerals set forth in the Drawings includes reference to the following elements as further discussed below:

| | |
|---|---|
| 10: motor rotor | 12: motor support shaft |
| 14: engine output shaft | 16: automatic transmission |
| 18: input shaft | 20: engine |
| 22: motor housing | 24: engine clutch |
| 26: motor | 28: motor cover housing |
| 30: support bearing | 32: motor position sensor |
| 36: concave portion | 38: torsion damper |
| 40: crank shaft | 42: torsion spring |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 1 is a schematic diagram illustrating the power transmission of a power transmission device for a hybrid vehicle in accordance with the present invention, and FIG. 2 is a schematic cross-sectional view illustrating the structure of a power transmission device for a hybrid vehicle in accordance with the present invention.

A power transmission device for a hybrid vehicle in accordance with a preferred embodiment of the present invention has a layout in which an automatic transmission 16 having an input shaft 18, a motor 26, a torsion damper 38, an engine output shaft 14 connected to a crank shaft 40 of an engine 20, and so on are directly connected on the same axis.

The present invention aims at optimally arranging the respective components of the power transmission device for a hybrid vehicle so as to provide an effect of reducing engine vibration, facilitate engine clutch control, and provide a package type layout enabling mass production.

First, the layout of a motor assembly directly connected between the engine 20 and the automatic transmission 16 will be described below.

The motor assembly comprises a motor rotor 10 and a motor support shaft 12 adapted for supporting the motor rotor 10. An outer end of the motor support shaft 12 is engaged with the motor rotor 10 and an inner end of the motor support shaft 12 extends toward the boundary between the engine output shaft 14 connected to the engine 20 and the input shaft 18 of the automatic transmission 16.

Here, the inner end of the motor support shaft 12 is formed integrally at the center position of the outer end of the motor support shaft 12 so as to have evenly distributed supporting strength and avoid undesired rotational momentum. In addition, as illustrated in FIG. 2, the inner end of the motor support shaft 12 has a sectional shape of "U".

Meanwhile, the motor assembly includes a motor housing 22 arranged to surround the outer circumference and the left side surface of the motor rotor 10 and the left side surface of the motor support shaft 12 at a predetermined distance.

Especially, an engine clutch 24 for power transmission between the engine output shaft 14 and the input shaft 18 of the automatic transmission 16 is provided. The engine clutch is disposed in a space between the left side end of the motor housing 22 and the left side surface of the inner end of the motor support shaft 12.

Accordingly, the motor rotor 10, the engine clutch 24, and the motor support shaft 12 supporting the motor rotor 10 are disposed in a space, i.e., inside the motor housing 22.

Consequently, the engine clutch 24 is disposed between the motor 26 and the automatic transmission 16 and a portion of the engine clutch 24 is arranged to overlap the inside of the motor 26, i.e., the inner circumference of the motor rotor 10, thus improving the space utilization.

Meanwhile, the motor assembly includes a motor cover housing 28 arranged to cover the right side surface of the motor rotor 10 and the right side surface of the inner end of the motor support shaft 12 at a predetermined distance.

In this case, a support bearing 30 for supporting the rotation of the motor support shaft 12 is mounted between the inner end of the motor support shaft 12 and the inner end of the motor cover housing 28.

Moreover, a motor position sensor 32 is mounted on the left side surface of the inner end of the motor cover housing 28, while being adjacent to the right side surface of the motor support shaft 12. The motor position sensor 32 detects the position and the rotational speed of the motor rotor 10.

Meanwhile, a concave portion 36 having a concave space is formed on the right side surface of the motor cover housing 28, and the torsion damper 38 is disposed in the concave portion 36 of the motor cover housing 28.

Accordingly, the motor rotor 10 and the torsion damper 38 are blocked from each other by the motor cover housing 28. The motor cover housing 28 prevents transmission oil from flowing to the torsion damper 38, and in turn reduces the amount of oil loss and prevents the drive loss of the torsion damper that may have otherwise caused by the transmission oil.

In this case, the torsion damper 38 includes a torsion spring 42 for attenuating torsional vibration of the engine.

That is, in order to effectively attenuate the torsional vibration of the engine, the torsion spring 42 is positioned on the outer circumference of the torsion damper 38 aligned with the motor rotor 10 and, in order to ensure the space, a portion of the torsion damper 38 is arranged to overlap the top of the crank shaft 40. As described above, the engine clutch is disposed between the motor and the automatic transmission, a portion of the engine clutch is arranged to overlap the inside of the motor, and a portion of the torsion damper is arranged to overlap the crank shaft. Accordingly, with the optimal layout in which the engine clutch, the motor, the motor housing, and the torsion damper are arranged in a space, it is possible to provide a package type layout enabling mass production.

Accordingly, the present invention provides the following advantageous effects.

With the layout in which the engine clutch is disposed between the motor and the automatic transmission, a portion of the engine clutch is arranged to overlap the inside of the motor, and the motor cover housing is mounted between the motor and the torsion damper to prevent the transmission oil from flowing to the torsion damper, it is possible to enhance the oil cooling effect for the engine clutch and the motor simultaneously.

With the optimal layout in which the engine clutch, the motor, the motor housing and the torsion damper are arranged in a space, the present invention provides an effect of reducing engine vibration, facilitates engine clutch control, and enables mass production.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power transmission device for a hybrid vehicle, in which an automatic transmission having an input shaft, a motor, the motor being engaged with the input shaft of the automatic transmission, a torsion damper, and an engine having an output shaft connected to a crank shaft of the engine are arranged in a row, the power transmission device comprising:

a motor support shaft, the outer end of which is supported by a motor rotor and the inner end of which extends toward the boundary between the output shaft of the engine and the input shaft of the automatic transmission, the inner end of the motor support shaft being formed integrally at the center position of the outer end of the motor support shaft;

a motor housing disposed to surround the outer circumference and the left side surface of the motor rotor;

an engine clutch disposed between the left side end of the motor housing and the left side surface of the inner end of the motor support shaft for providing power transmission between the output shaft of the engine and the input shaft of the automatic transmission;

a motor cover housing arranged so as to cover the right side surface of the motor rotor and the right side surface of the inner end of the motor support shaft and including a concave portion on the right side surface thereof; and a torsion damper positioned in the concave portion of the motor cover housing to be blocked from the motor rotor;

a support bearing for supporting the rotation of the motor support shaft, the support bearing mounted between the inner end of the motor support shaft and the inner end of the motor cover housing; and a motor position sensor mounted on the left side surface of the inner end of the motor cover housing, while being adjacent to the right side surface of the motor support shaft.

2. The power transmission device of claim 1, wherein the torsion damper comprises on an outer circumference thereof a torsion spring for attenuating torsional vibration of the engine.

3. The power transmission device of claim 1, wherein the torsion damper has a portion arranged to overlap the top of the crank shaft.

4. A hybrid vehicle comprising a power transmission device of claim 1.

* * * * *